US010165354B1

(12) United States Patent
Toda et al.

(10) Patent No.: US 10,165,354 B1
(45) Date of Patent: Dec. 25, 2018

(54) SOUND SYSTEM FOR VEHICLE

(71) Applicant: Mazda Motor Corporation, Aki-gun, Hiroshima (JP)

(72) Inventors: Isao Toda, Hatsukaichi (JP); Katsumasa Sogame, Higashihiroshima (JP); Koji Wakamatsu, Hiroshima (JP); Hironobu Hashiguchi, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 0 days.

(21) Appl. No.: 16/013,186

(22) Filed: Jun. 20, 2018

(30) Foreign Application Priority Data

Jun. 22, 2017 (JP) ................................ 2017-121964

(51) Int. Cl.
*H04B 1/00* (2006.01)
*H04R 1/40* (2006.01)
*H04R 3/12* (2006.01)
*H04R 29/00* (2006.01)
*H04R 1/02* (2006.01)

(52) U.S. Cl.
CPC ............. *H04R 1/403* (2013.01); *H04R 1/025* (2013.01); *H04R 3/12* (2013.01); *H04R 29/002* (2013.01); *H04R 2499/13* (2013.01)

(58) Field of Classification Search
CPC .......... H04R 1/403; H04R 1/025; H04R 3/12; H04R 29/002; H04R 2499/13
See application file for complete search history.

(56) References Cited

U.S. PATENT DOCUMENTS 7,106,180 B1 * 9/2006 Pompei ................. A01M 29/18
116/22 A
2006/0281403 A1 * 12/2006 Richards .................. H04R 3/04
455/3.06
2012/0306637 A1 * 12/2012 McGough ............. B60K 37/06
340/439

FOREIGN PATENT DOCUMENTS

JP H585288 A 4/1993
JP 2776092 B2 7/1998

* cited by examiner

*Primary Examiner* — Andrew L Sniezek
(74) *Attorney, Agent, or Firm* — Alleman Hall Creasman & Tuttle LLP

(57) ABSTRACT

A sound system for a vehicle including an engine and an audio device for an internal space of a cabin as sound sources disposed at given positions of the vehicle is provided. The audio device is switchable between a first mode in which an audio sound including both an audible sound and an inaudible sound for a human is reproduced in the cabin and a second mode in which an audio sound including the audible sound but not including the inaudible sound is reproduced in the cabin. The sound system includes a traveling state detector configured to detect a traveling state of the vehicle, and a switch controlling module executable by a processor configured to reproduce the audio sound in the first mode under a condition that a given traveling state is detected by the traveling state detector.

11 Claims, 8 Drawing Sheets

SOUND SYSTEM FOR VEHICLE

TECHNICAL FIELD

The present disclosure relates to a sound system for a vehicle.

BACKGROUND OF THE DISCLOSURE

Vehicles are generally equipped with audio devices which play an audio sound inside a cabin. JP2776092B and JP1993-085288A disclose audio devices which perform localization of an audio sound so that person(s) on board is able to hear the audio sound from a given position in a cabin.

Incidentally, a vehicle driver is required to focus on driving (a traveling state of a vehicle which changes as the vehicle is driven) when enjoying driving a sports car, etc. Meanwhile, the driver tends to want to enjoy an audio sound for relaxation during steady travel.

SUMMARY OF THE DISCLOSURE

The present disclosure is made in view of the above situations and aims to provide a sound system for a vehicle, which is capable of effectively utilizing an audio sound to suitably switch between a state for enjoying the audio sound and a state for focusing on driving.

Basically, in the present disclosure, focusing on widespread audio devices which are capable of reproducing an inaudible sound in addition to an audible sound, a hypersonic effect which activates the human brain to enhance concentration when hearing the inaudible sound on top of the audible sound, is suitably used.

Specifically, in order to achieve the above purpose, according to one aspect of the present disclosure, a sound system for a vehicle including an engine and an audio device for an internal space of a cabin as sound sources disposed at given positions of the vehicle is provided. The audio device is switchable between a first mode in which an audio sound including both an audible sound and an inaudible sound for a human is reproduced in the cabin and a second mode in which an audio sound including the audible sound but not including the inaudible sound is reproduced in the cabin. The sound system includes a traveling state detector configured to detect a traveling state of the vehicle, and a switch controlling module executable by a processor to reproduce the audio sound in the first mode under a condition that a given traveling state is detected by the traveling state detector.

According to this configuration, the audio sound is normally reproduced in the second mode in which the inaudible sound is not included, whereas when the given traveling state is detected, it is reproduced in the first mode in which the audible sound and the inaudible sound are both included. In this manner, the driver's brain is activated to focus on driving, which is obviously preferable for safe driving.

The switch controlling module may reproduce the audio sound in the second mode unless the given traveling state is detected by the traveling state detector.

Preventing unnecessary reproduction of the inaudible sound is preferable for preventing the driver's brain from being fatigued.

The sound system may further include an engine sound localizer configured to localize a sound generated by the engine to cause a vehicle driver inside the cabin to hear the sound from a first position, an audio sound localizer configured to localize an audio sound generated by the audio device to cause the driver to hear the sound from a second position, and a localized position controlling module executable by the processor to control a distance between the first and second positions. When the audio sound is reproduced in the first mode, the localized position controlling module may control the distance between the first and second positions to be closer than when the audio sound is reproduced in the second mode.

When the audible sound and the inaudible sound are both reproduced, since the localized position of the audio sound is brought closer to the localized position of the engine sound, the driver hears both the engine sound and the audio sound from the close positions, and the driver's brain is effectively activated by the audio sound while clearly recognizing the state of the vehicle based on the engine sound. Especially since the positions from where the engine sound and the audio sound are heard are close to each other, when the driver hears the engine sound and the audio sound, the driver rarely needs to intentionally separate the positions from which the sounds are heard, which is preferable in causing the driver to focus on driving further effectively.

When the audio sound is reproduced in the first mode, the localized position controlling module may control the first and second positions to overlap with each other.

Thus, the above focusing effect is sufficiently obtained.

The first position may unchangeably be set at a fixed position and the localized position controlling module may change the second position.

Since the change in the distance between the localized position of the engine sound and the localized position of the audio sound is performed at the audio sound side whose localized position is easier to change, the positions are easily controlled.

The first position and the second position may be set forward of the vehicle driver seated on a driver seat. In the second mode, the second position may be set lower than the first position. In the first mode, the second position may be moved upwardly to be closer to the first position.

Since it is easy for the driver to hear the sound from his/her upper front side, the above configuration is preferable in causing the driver to recognize especially the engine sound. Further, when the first mode for causing the driver to focus on driving is set, the localized position of the audio sound which is normally set at a low position is changed upwardly so that the audio sound which urges brain activation is brought close to the localized position of the engine sound. Thus, the driver's brain is sufficiently activated by using the audio sound, which is preferable for causing the driver to focus on driving.

The given traveling state may be a traveling state in which an operation load on the driver increases.

Although the driver is requested to focus on driving more when the operation load is high, this configuration satisfies such a request.

The traveling state where the operation load on the driver increases may be a traveling state in which an engine speed exceeds a given speed.

In this case, the driver is caused to focus on driving in a state where the engine speed increases, which is preferable for improving safety.

The traveling state where the operation load on the driver increases may be a traveling state in which a lateral acceleration acting on the vehicle exceeds a given value.

In this case, the driver is caused to focus on driving in a state where acceleration acting on a vehicle body increases, which is preferable for improving safety.

DETAILED DESCRIPTION OF THE DISCLOSURE

Figure 1:
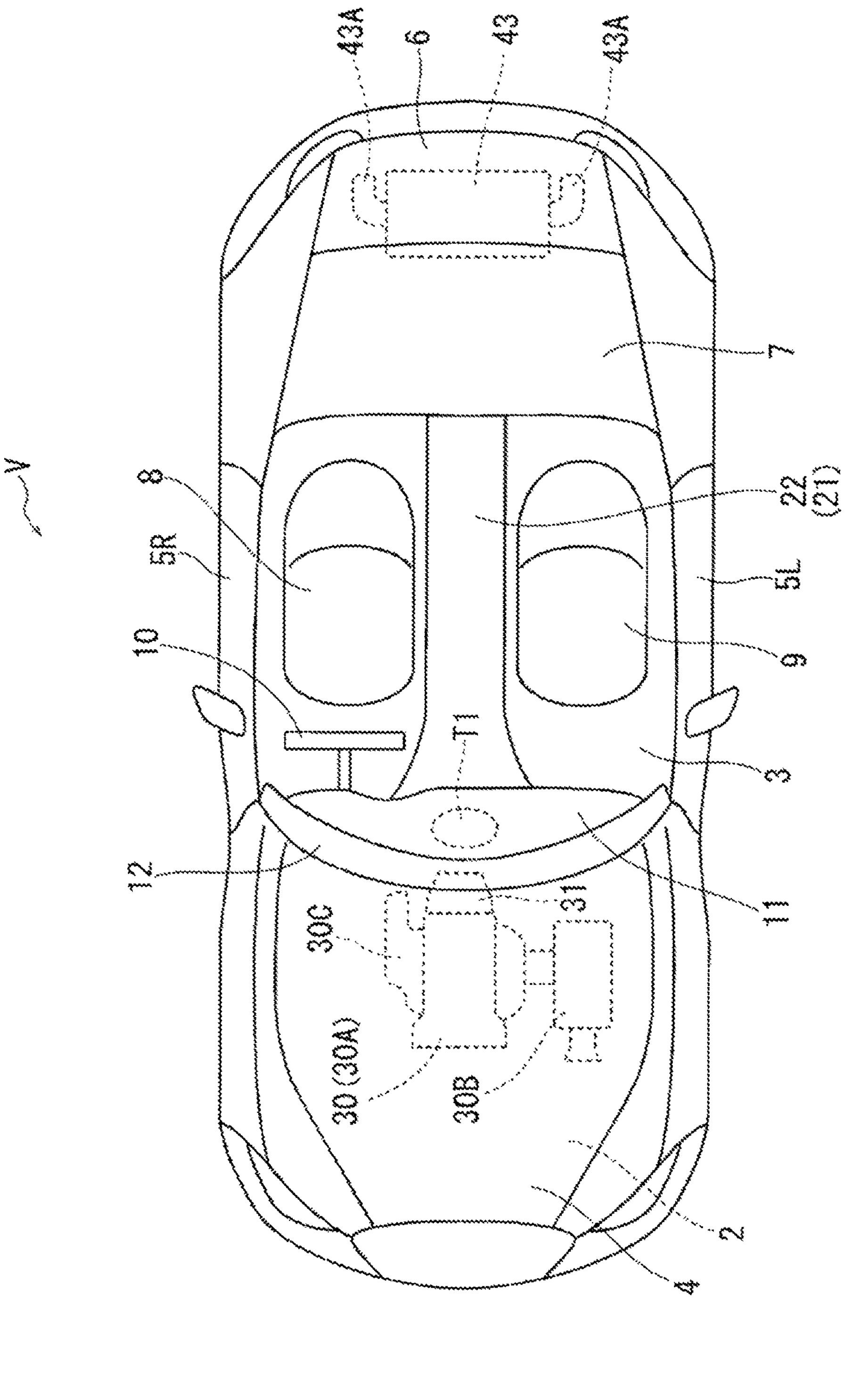
FIG. 1 is a plan view illustrating one example of a vehicle to which the present disclosure is applied.
Figure 2:
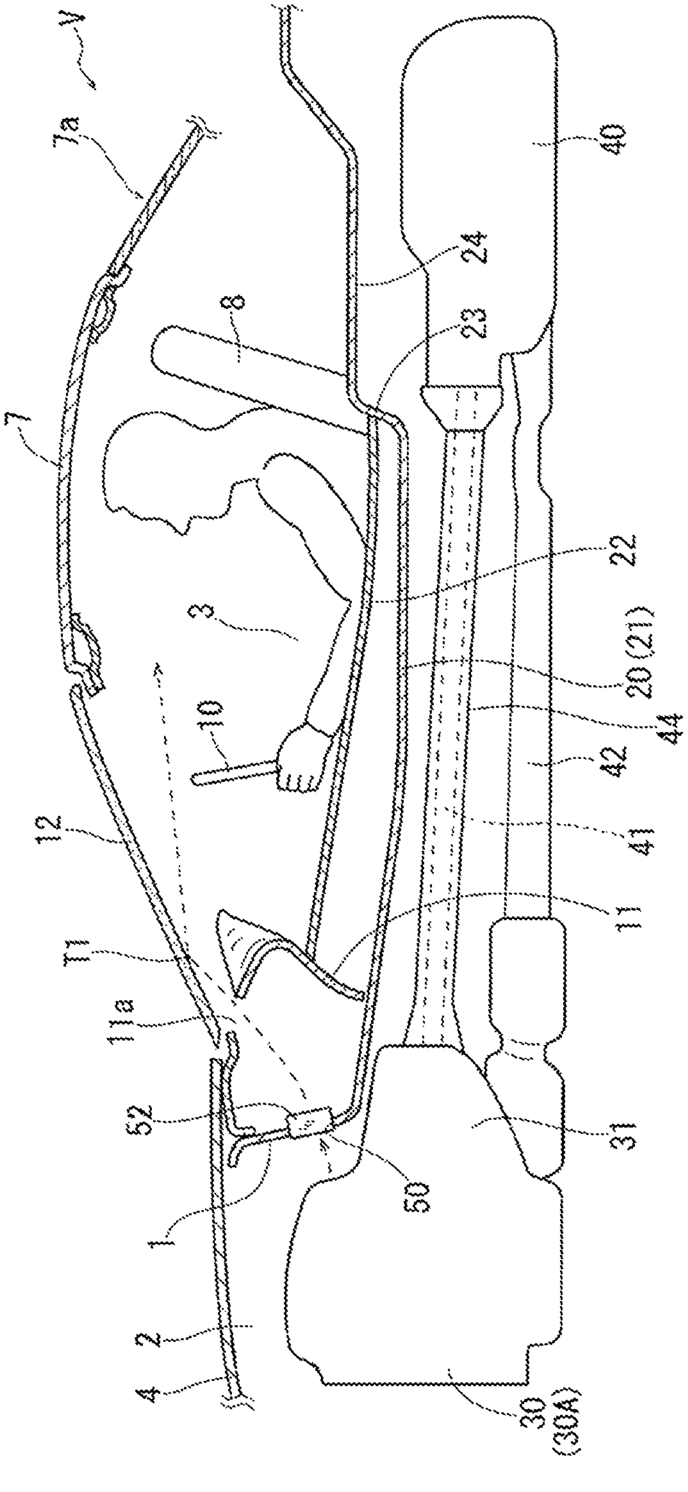
FIG. 2 is a partial cross-sectional side view of the vehicle illustrated in FIG. 1.

In FIGS. 1 and 2, a vehicle V of this embodiment is a two-door convertible. Here, the reference character "1" is a dashboard dividing an engine bay 2 from a cabin 3. The reference character "4" is a hood covering the engine bay 2 from the top thereof, the reference characters "5R" and "5L" are a pair of left and right side-doors, the reference character "6" is a trunk lid, and the reference character "7" is a roof. Further the reference character "8" is a driver seat, the reference character "9" is a front passenger seat, and the reference character "10" is a steering wheel. Additionally, the reference character "11" is an instrument panel and the reference character "12" is a front windshield.

As illustrated in FIG. 2, the roof 7 has a rear windshield 7*a*. FIG. 2 illustrates a state where the roof 7 is closed, i.e., the top of the cabin 3 is covered by the roof 7. Although FIG. 1 also illustrates the closed roof 7, the roof 7 is seen through and an upper end part of the front windshield 12 is partially cut out for the sake of illustration.

A floor panel 20 constituting a floor surface of the cabin 3 has a tunnel part 21 extending front-and-rear directions (longitudinal directions) of the vehicle in its center part in left-and-right directions (lateral directions, width directions) of the vehicle, and an upper surface of the tunnel part 21 is covered by a trim member 22. A rear end part of the floor panel 20 connects to a rear panel 24 via a kick-up part 23.

The engine bay 2 formed forward of the dashboard 1 is provided with an engine 30. The engine 30 of this embodiment is placed longitudinally. An engine body is denoted with "30A," an intake-system member is denoted with "30B," and an exhaust-system member is denoted with "30C." A transmission 31 is coupled to a rear part of the engine 30 (engine body 30A).

Note that although the engine 30 is equipped with auxiliary equipment, such as an alternator and an air-conditioning compressor which are driven by the engine body 30A, they are not illustrated. An engine sound is a mixture of a sound generated when the engine body 30A rotates or performs combustion, an intake sound, an exhaust sound, and also a sound of the auxiliary equipment being driven.

A differential (differential gear) 40 is disposed in a rear part of the vehicle V. The differential 40 is coupled to the transmission 31 (i.e., the engine 30) via a propeller shaft 41. That is, the vehicle V of this embodiment is a rear-wheel drive vehicle. Further, the transmission 31 and the differential 40 are coupled by an annular-shaped torque tube 44 disposed to wrap around the propeller shaft 41.

An exhaust passage 42 extends rearward from the engine 30. This exhaust passage 42 is connected to a muffler 43 disposed under the rear part of the vehicle. The muffler 43 is connected to a pair of left and right exhaust pipes 43A opening rearward. The exhaust gas is finally discharged outside (to the atmosphere) from the exhaust pipes 43A.

Figure 4:
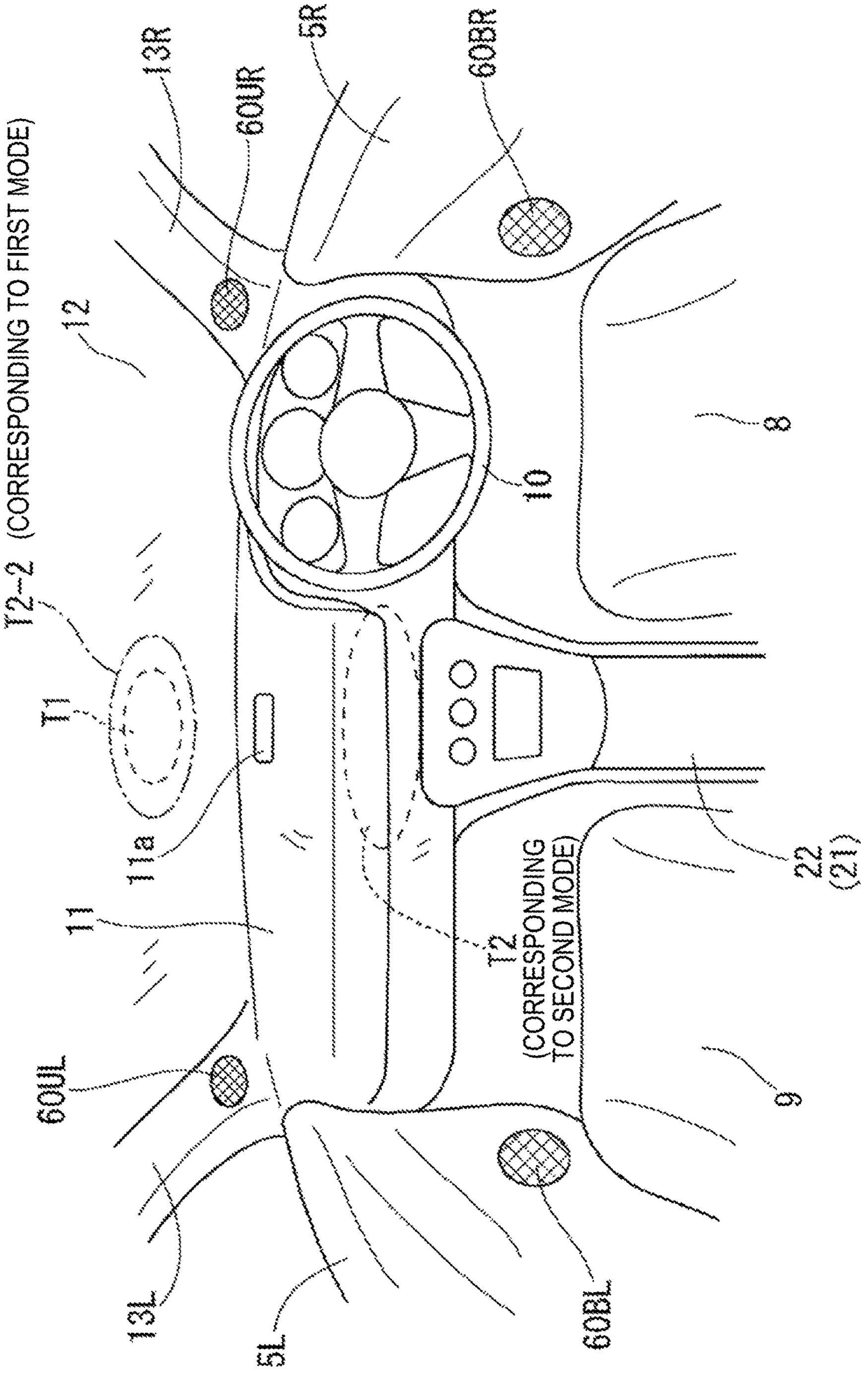
FIG. 4 is an elevational view of a cabin when looking forward from a rear part thereof, illustrating one example of localized positions of an engine sound, an audio sound, and an alarm sound.

Next, localization of the engine sound and an audio sound will be described. First, as illustrated in FIG. 4, a first position (section or area) to which the engine sound is localized is denoted with the reference character "T1," and a second position to which the audio sound is localized is denoted with the reference character "T2" or "T2-2." That is, the localized position of the audio sound selectively takes one of T2 and T2-2.

The localized positions T1, T2, and T2-2 of this embodiment are individually set to be located forward of a vehicle driver seated at the driver seat 8. That is, the first position T1 is set in the front windshield 12. For example, the first position T1 is set in a center part of the front windshield 12 in the width directions, substantially at the same height as the driver's eyes.

Further the localized position T2 is set at a position lower than the first position T1 by a given distance. For example, the second position T2 is set to be located in a substantially center part of a surface of the instrument panel 11 facing substantially rearward. This second position T2 is set to have a wider area than the first position T1 in the width directions (to cause the driver and the front passenger hear the audio sound).

Note that the first and second positions T1 and T2 are separated from each other by the given distance so that the engine sound and the audio sound are distinguishable from each other, and the given distance is at least 30 cm, more preferably 50 cm or more. Note that the localized position of the audio sound is changeable (movable) between T2 and T2-2, and T2-2 overlaps with the first position T1. That is, when the localized position T2 is moved upward to the position of T2-2, the localized position overlaps with the first position T1.

The localized position T2 illustrated in FIG. 4 is selected in a default (basic) state, i.e., in a second mode in which only an audible sound which does not include an inaudible sound is reproduced. On the other hand, the localized position T2-2 is selected in a first mode in which both the audible sound and the inaudible sound are reproduced. Note that in this embodiment, a sound in a frequency band exceeding 50 kHz is set to be the inaudible sound.

The switch (selection) between the localized positions T2 and T2-2 is performed according to a preset traveling state. That is, for example, only when an operation load becomes high as a traveling condition, in order to cause the driver's brain to activate and focus on driving (traveling), the first mode in which the audio sound including the inaudible sound is reproduced is applied and the localized position thereof is set to T2-2. When the operation load is not high, the second mode is applied and the localized position of the audio sound is set to T2.

The state where the operation load becomes high is also considered to be a situation where driving is actively performed, for example, when an engine speed is as high as above a given speed, when G (g-force) which acts on a vehicle body (one or both of lateral acceleration and longitudinal acceleration) is higher than a given value, when traveling on a winding road, when acceleration/deceleration is frequently performed, when a steering operation is frequently performed, when traveling on a mountain road, when traveling on a circuit road, when a vehicle speed is high (e.g., above 80 km/h), etc. Furthermore, a mode switch which is manually controlled by the driver may be provided so that the second position T2 is moved (changed) according to the control of the mode switch.

Note that the change between the localized positions T2 and T2-2 is preferably performed gradually (e.g., over about 3 to 4 seconds) in view of preventing or reducing a sharp change in the hearing. Further, the change from T2 to T2-2 may be performed swiftly while the resumption from T2-2 to T2 may be performed gradually.

Figure 3:
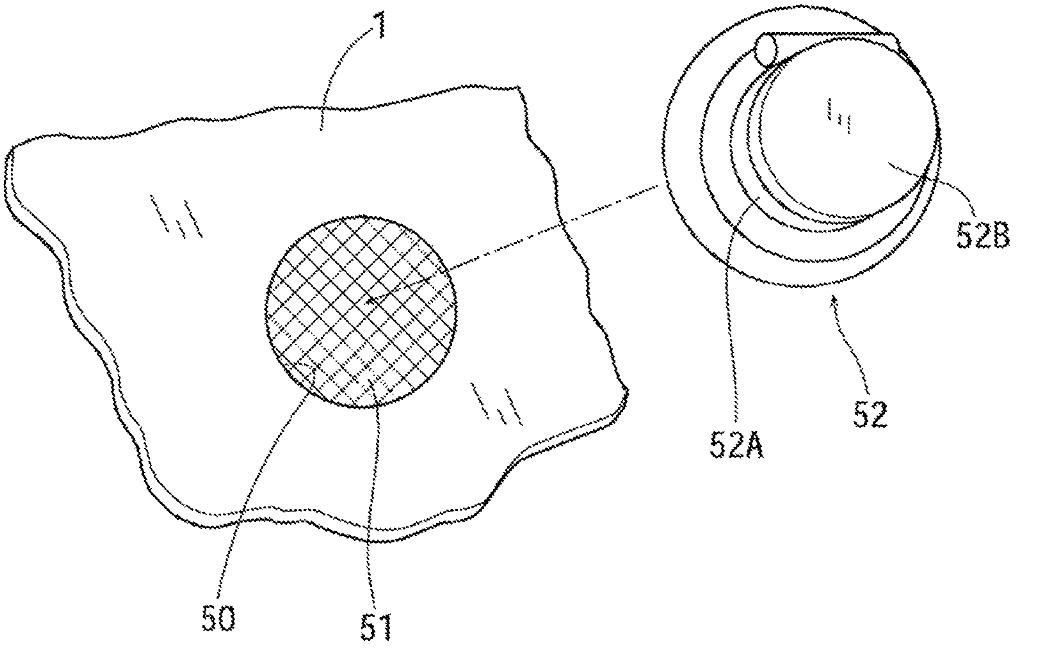
FIG. 3 is an exploded perspective view illustrating a structure of an engine sound transparent section formed in a dashboard.

Next, a specific structural example in which the engine sound is localized to the first position T1 will be described. First, as illustrated in FIG. 3, the dashboard 1 is formed with an opening 50 at a position equivalent to that of the engine 30 (engine body 30A) in height (up-and-down directions) and in the width directions. This opening 50 communicates the engine bay 2 with the inside of (a space formed by) the instrument panel 11. Further the opening 50 is covered by a film member 51 which blocks air and liquid. Thus, the engine sound from the engine bay 2 is effectively transmitted into the instrument panel 11 by vibrating the film member 51.

The instrument panel 11 is formed with an opening 11*a* in its upper surface (see FIG. 2). The engine sound transmitted into the instrument panel 11 is further transmitted toward the front windshield 12 through the opening 11*a* and reflects on the front windshield 12 to be transmitted to the driver seated on the driver seat 8. Thus, the first position T1 is a section where the engine sound reflects on the front windshield 12. Air and liquid in the engine bay 2 are prevented from flowing into the cabin 3 by being sealed by the film member 51.

As illustrated in FIG. 3, the opening 50 covered by the film member 51 is attached with a valve member 52. The valve member 52 has a short cylindrical member 52A extending to the opening 50 and an electromagnetic valve body 52B which opens and closes the cylindrical member 52A. In this embodiment, the valve member 52 is normally fully opened so that the engine sound from the opening 50 is normally transmitted into the instrument panel 11 through the cylindrical member 52A. Note that the opening of the valve member 52 may be changeable according to a traveling state of the vehicle (e.g., the opening of the valve member 52 is increased as the engine sound or a vehicle speed increases). Any one or more of the components constituting the above-described structure which localizes the engine sound to the first position T1 may be referred to as the engine sound localizer.

For the localization of the audio sound to the second position T2 (or T2-2), in this embodiment, as illustrated in FIG. 4, a total of four speakers, upper left and right speakers 60UL and 60UR and lower left and right speakers 60BL and 60BR are provided (i.e., a plurality of speakers). The pair of upper left and right speakers 60UL and 60UR are full-range tweeter speakers and attached to left and right front pillars 13L and 13R, respectively. The pair of lower left and right speakers 60BL and 60BR are also full-range tweeter speakers and attached to the left and right side-doors 5L and 5R, respectively.

By using the four speakers 60UL, 60UR, 60BL, and 60BR, the audio sound is localized so as to be hearable from the second position T2 or T2-2 in a manner of known time alignment. Further, the second position T2 (or T2-2) may be moved from the position illustrated in FIG. 4 to a desired position, such as downward, leftward (in one the of the width directions which is away from the driver seat 8 and approaches the front passenger seat 9), downward to the left (an oblique direction corresponding to a movement for separating from the driver seat 8 in the width directions while moving downward) or rearward of the driver seat, in the manner of known time alignment. Any one or more of the components constituting the above-described structure which localizes the audio sound to the second position T2 or T2-2 may be referred to as the audio sound localizer. One known method of localization through time alignment includes using a digital sound processor (DSP) such as DSP 70 described below with an appropriate algorithm (e.g., software module). The DSP controls the phase and magnitude of the sound waves emitted by each speaker to align in such a way that some waves cancel each other out at certain locations where sound is not desired, and other waves are summed into a stronger wave at other locations where sound is desired. Using these techniques, the DSP 70 may process the audio signal for sounds emitted through each speaker to cause the perceived position of the sound to vary within the cabin of the vehicle.

Figure 5:
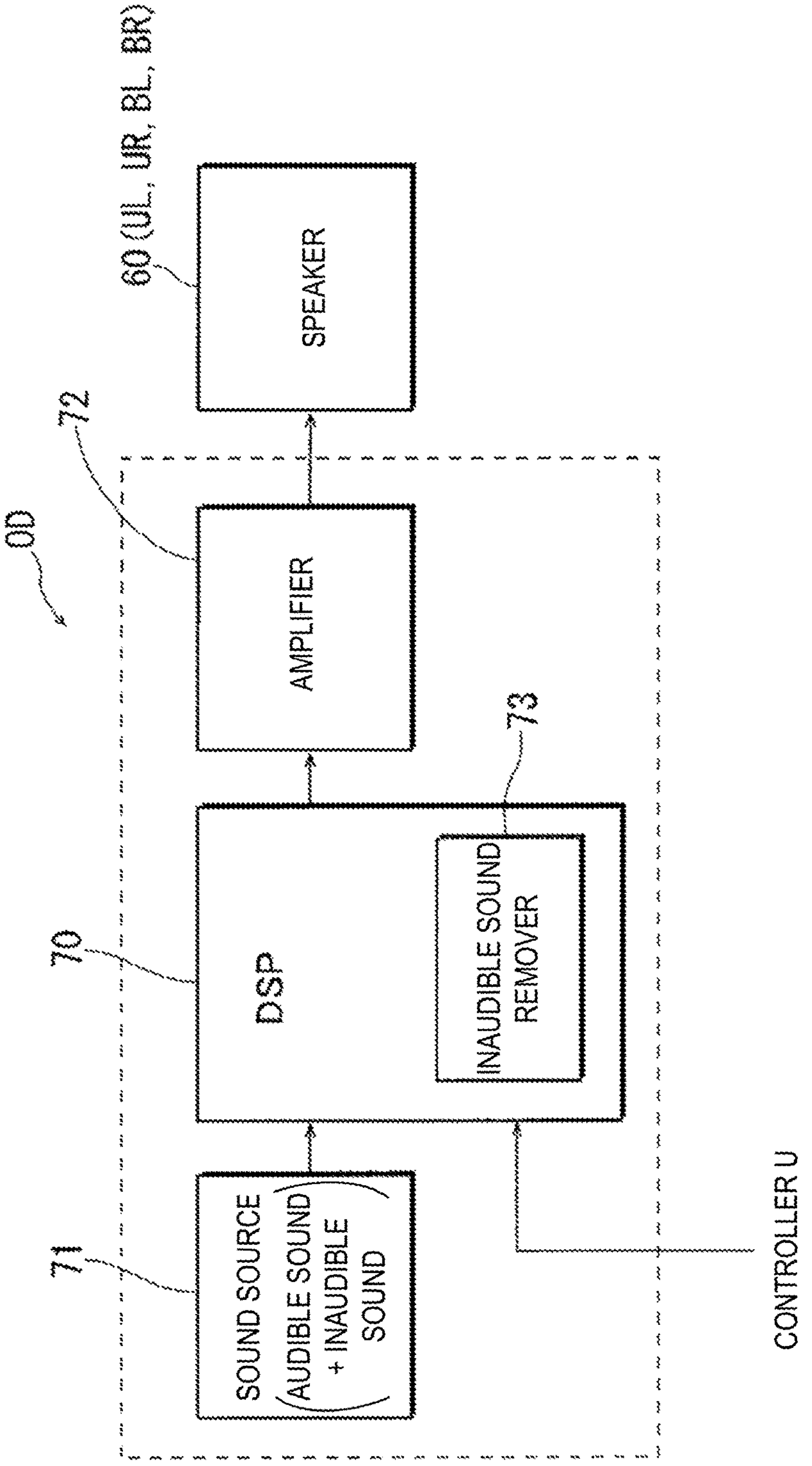
FIG. 5 is a block diagram illustrating one example of a control system of an audio device.

FIG. 5 illustrates one example of an audio device OD. In FIG. 5, the reference character "70" is a DSP. Once this DSP 70 receives a signal from a sound source 71 for audio, it performs the processing of time alignment described above so that the audio sound is localized to the second position T2, and drives the speakers 60UL, 60UR, 60BL, and 60BR via an amplifier 72. Furthermore, a control for moving the second position T2 according to an instruction signal from a controller U described later is performed.

The sound source 71 has a high resolution at which the audio sound including the frequency range exceeding 50 kHz is reproducible, and the audio sound including both (frequency ranges of) the audible sound and the inaudible sound is reproducible. Further, the DSP 70 has a filter 73 which removes (the frequency range of) the inaudible sound. An ON/OFF state of the filter 73 is controlled by the controller U so that the reproducing state in the first mode including both the audible sound and the inaudible sound as the audio sound reproduced by the speakers 60 and the reproducing state in the second mode only including the audible sound due to the inaudible sound being removed by the filter 73 are switched therebetween.

Note that in one modification of FIG. 5, while the sound source 71 only reproduces the audible sound, another sound source which only reproduces the inaudible sound may separately be provided. In this case, in the first mode, the other sound source is operated so that the audio sound outputted from the speakers includes both the audible sound and the inaudible sound. Further, in the second mode, the other sound source is suspended so that the audio sound outputted from the speakers includes only the audible sound from the sound source 71.

In this manner, the driver clearly recognizes the engine sound localized to the first position T1 and also the traveling state of the vehicle, and thus, is able to focus on driving as well as enjoying driving, which are preferable in safe driving. When driving requires particular attention, the audio sound is reproduced in the first mode including both the audible sound and the inaudible sound, and the localized position of the audio sound as indicated by T2-2 overlaps with the first position T1 which is the localized position of the engine sound. Thus, the brain activation by the hypersonic effect is stimulated and attention on driving is enhanced. Needless to say, that when such particular attention is not required (e.g., the operation load is low), only the audible sound is reproduced and also the localized position of the audio sound is separated from the first position T1 as indicated by T2. Therefore, the driver is able to enjoy the audio sound in a relaxed situation (the audio sound is clearly distinguished from the engine sound).

Figure 6:
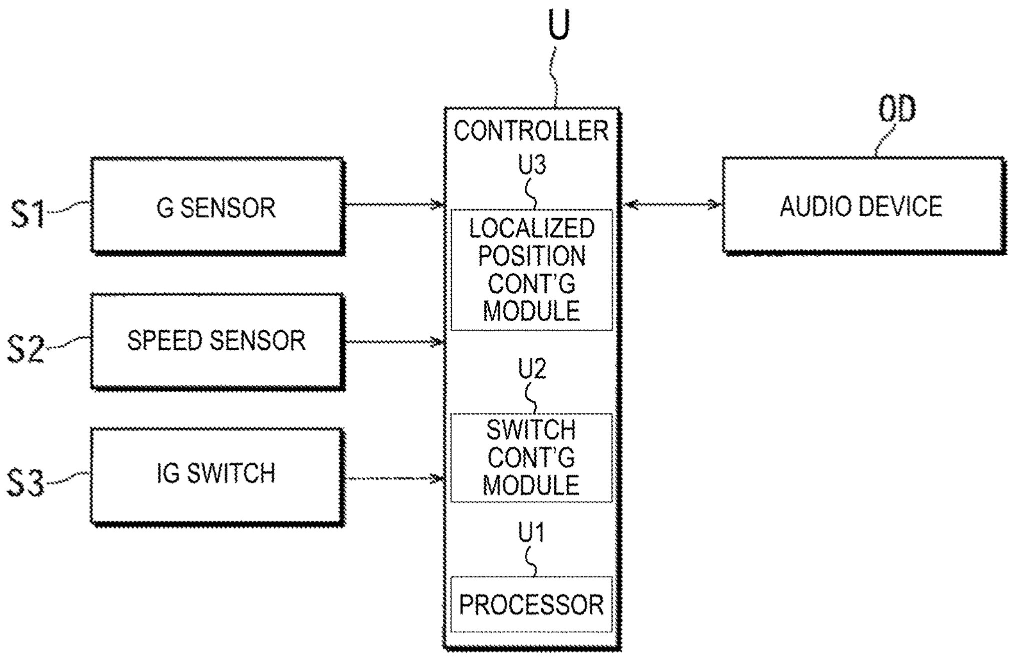
FIG. 6 is a view illustrating one example of a control system for changing the localized position of the audio sound.

FIG. 6 illustrates an example of a control system when changing the second position. In FIG. 6, the reference character "U" is a controller (corresponding to the controller in FIG. 5) configured by a microcomputer including a processor U1 and performs a switching instruction between the first and second modes (by executing a switch controlling module U2) and a positional instruction for the second position (by executing a localized position controlling module U3) to the audio device OD of FIG. 5. The various software modules of the controller U are stored in memory such as ROM and RAM and executed by the processor U1 to perform their respective functions. This controller U receives signals from sensors and switch S1 to S3. "S1" is a G sensor (i.e., an accelerometer) which detects g-forces which act on the vehicle body (accelerations and decelerations in the longitudinal and lateral directions). "S2" is an engine speed sensor which detects the engine speed. "S3" is an ignition switch. Any one or more of the sensors and/or switch S1 to S3 may be referred to as the traveling state detector.

Figure 7:
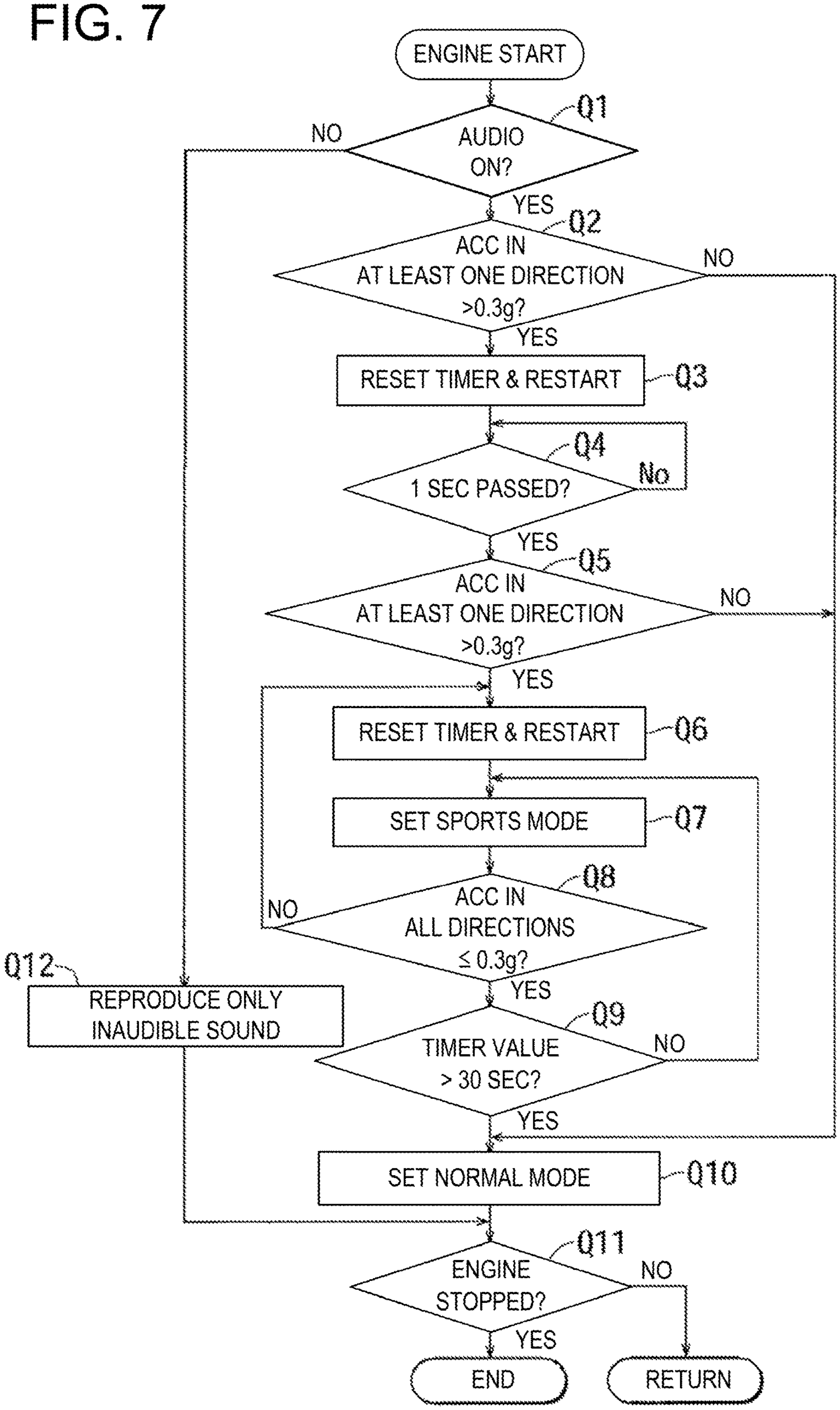
FIG. 7 is a flowchart illustrating a control example for changing the localized position of the audio sound.

Next, a control example of the controller U is described while referring to the flowchart of FIG. 7. Hereinafter, "Q" indicates steps, and the given traveling condition for moving the second position T2 from the default position corresponding to the second mode is that at least one of the lateral acceleration and the longitudinal acceleration which act on the vehicle body is higher than a given preset value. Moreover, the control of FIG. 7 is started when the ignition switch S3 is turned on. Further below, in a normal mode, the audio sound is reproduced in the second mode while the localized position of the audio sound is set to T2 as the default position. Furthermore, in a sports mode, the audio sound is reproduced in the first mode while the localized position of the audio sound is set to T2-2 which overlaps with the first position T1.

First at Q1, whether the audio device OD is ON is determined. If the result of Q1 is YES, at Q2, whether at least one of the longitudinal acceleration and the lateral acceleration is higher than the given value (e.g., 0.3 g) is determined. If the result of Q2 is YES, at Q3, a timer is reset to an initial value 0 and starts counting again. Then at Q4, whether a given short period of time (1 second in this embodiment) has passed since a larger acceleration than the given value is detected. If the result of Q4 is NO, the determination at Q4 is repeated.

If the result of Q4 is YES, the same determination as Q2 is performed again at Q5. If the result of Q5 is YES, this means that a large acceleration is continuously (or repeatedly) generated in the short period of time, and the driver is actively driving to enjoy traveling.

If the result of Q5 is YES, at Q6, the timer is reset to 0 and starts counting again. Then at Q7, the sports mode is set and the audio sound is reproduced in the first mode while the localized position thereof is moved (changed) to T2-2 which overlaps with the first position T1.

After Q7, at Q8, whether the longitudinal and lateral acceleration are both equal to or less than the given value (0.3 g in this embodiment) is determined. If the result of Q8 is NO, the process returns to Q6.

If the result of Q8 is YES, at Q9, whether the count value of the timer exceeds a given long period of time (30 seconds in this embodiment). If the result of Q9 is NO, the process returns to Q7.

If the result of Q9 is YES, this means that the state where the sports mode is not performed is clearly confirmed, and thus at Q10, the mode is changed to the normal mode (the audio sound is reproduced in the second mode and the localized position thereof is resumed to T2 which is the default position).

If the result of Q1 is NO, at Q12, only the inaudible sound is reproduced as the audio sound. In this case, although the localized position of the audio sound may be T2 or T2-2, it is localized to T2-2 in this embodiment. Note that when shifting to Q12, the audio switch is OFF, this means that person(s) on board does not request to listen and enjoy the audio sound. In this case, even if the inaudible sound is reproduced and played in the cabin, the person on board does not notice that the audio sound is reproduced. This Q12 is processing using only the inaudible sound for the sake of activating the brain. Note that if the result of Q1 is NO, the process may return directly.

If the result of Q2 or Q5 is NO, the process shifts to Q10.

After Q10 or Q12, at Q11, whether the engine is stopped is determined. If the result of Q11 is NO, the process returns to Q1. On the other hand, if the result of Q11 is YES, the control is terminated.

As is apparent from the above description, in the embodiment of FIG. 7, when the sports mode is set, the sports mode is maintained (a frequent change between the sports mode and the normal mode is reduced) until it is confirmed that the given traveling condition for setting the sports mode remains not satisfied for a given long period of time (30 seconds in the embodiment). In order to prevent or reduce the frequent change between the sports mode and the normal mode, for example, the given value (the value of acceleration) of Q8 may be set smaller than that of Q2 or Q5 by a given value.

Figure 8:
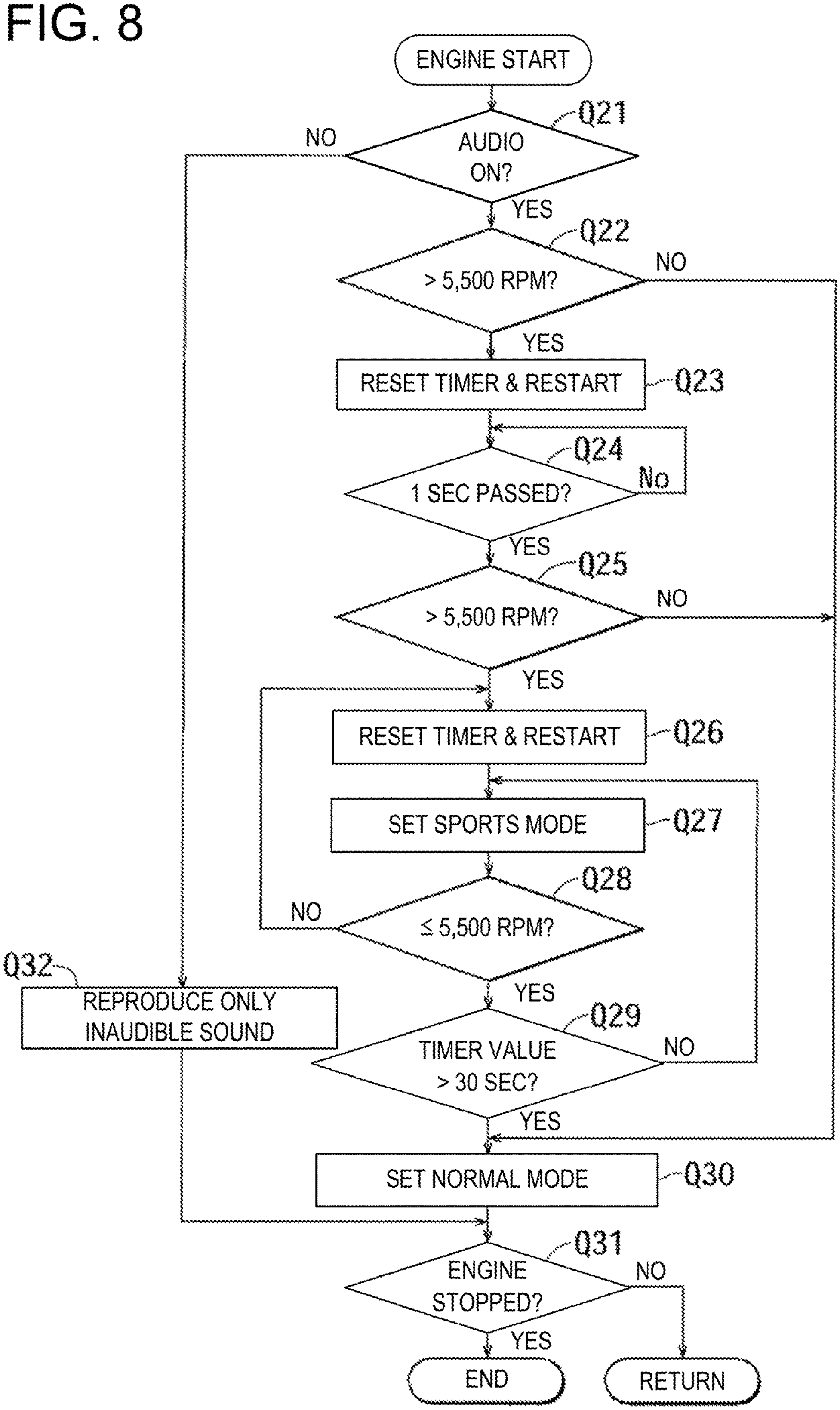
FIG. 8 is a flowchart illustrating another control example for changing the localized position of the audio sound.

FIG. 8 illustrates another control example corresponding to FIG. 7. In this control example, as the given traveling condition, the engine speed is used instead of acceleration acting on the vehicle body. That is, at Q22 (corresponding to Q2 in FIG. 7), Q25 (corresponding to Q5 in FIG. 7), and Q28 (corresponding to Q9 in FIG. 7), whether the engine speed is higher than (or equal to or lower than) a given speed (5,500 rpm in this embodiment) is determined. That is, in this embodiment, a highest allowable engine speed is set to about 7,500 rpm, and the engine speed of 5,500 rpm as the given value is set as a high speed which is lower than the highest allowable speed by a given amount (around a speed at which a highest output or the highest torque is generated). The control of FIG. 8 is only different from the control in FIG. 7 in that the engine speed is used instead of acceleration, therefore redundant descriptions are omitted.

Further, the switching between the sports mode and the normal mode may be performed according to an accelerator opening, and in this case, the sports mode may be set when the accelerator opening is large (above a given opening), and the normal mode may be set when the accelerator opening is small.

Although the embodiment is described above, the present disclosure is not limited to the embodiment, and suitable changes are possible within the range described in the claims. The first position T1 may be set suitably, for example, the first position T1 may be set at a lower position than the second position T2 (e.g., the first position T1 is set at a position in or lower than an upper surface of the instrument panel 11, while the second position T2 is set at a position higher than the upper surface of the instrument panel 11). Moreover, the first position T1 may be set at a position on the driver side than the center part of the vehicle in the width directions (since the engine sound is more important information for the driver than the front passenger). The number of speakers may be selected suitably, e.g., six or more, and the disposed positions thereof may also be selected suitably, e.g., dispose some of the speakers in the instrument panel 11.

A traveling state where the driver is required to focus on the driving, for example, when entering a mountain road is detected by a navigation device mounted on the vehicle, the audio reproducing mode may be switched from the second mode to the first mode.

The areas of the localized positions T1 and T2 (or T2-2) are not limited to those illustrated and may be, for example, wider areas in the width directions and/or the up-and-down directions of the vehicle. The position of T1 may be variable within the front windshield 12 according to the vehicle state, such as a steering angle. In the first mode, alternatively to overlapping the localized position of the engine sound with the localized position of the audio sound, they may be located closer to each other compared to in the second mode.

The change of the localized position may be performed only for the engine sound or for both the engine sound and the audio sound. For example, in the embodiment illustrated in FIGS. 1 to 3, the change of the localized position of the engine sound may be performed by providing a reflective part or an angle changing part in the traveling path of the engine sound toward inside the cabin, to change the path of the engine sound. Alternatively, the localized position of the engine sound may be changed by providing a similar structure to that in FIG. 3 at a plurality of positions and switching the open/close state of the valve member at each position. The localization may be not performed for one or both of the engine sound and the audio sound.

The present disclosure is not limited to be applied to the convertible but is also applicable to various types of vehicles, such as a sedan type, a sport utility vehicle (SUV) type, and a four-wheel drive vehicle. The application may also be to a vehicle in which the transmission 31 is disposed in the rear part of the vehicle (at the position of the differential 40), a front-wheel drive vehicle having no propeller shaft 41 (i.e., a front-engine, front-wheel-drive (FF) vehicle), or a vehicle in which the engine 30 is disposed rearward of the cabin. The audio sound may be not localized (so that the audio sound is hearable from the entire range of wide surroundings or from respective installation positions of the plurality of speakers) depending on the situation (when the engine sound is requested to be emphasized). It is needless to say that the purpose of the present disclosure is not limited to what is explicitly described, but also implicitly includes providing what is expressed as substantially preferable or advantageous.

According to the present disclosure, the audio sound may effectively be utilized to activate the driver's brain when needed, to cause the driver to focus on driving.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

T1: Localized Position of Engine Sound
T2: Localized Position of Audio Sound (corresponding to Second Mode)
T2-2: Localized Position of Audio Sound (corresponding to First Mode)
OD: Audio Device
U: Controller
S1: G Sensor (accelerometer)
S2: Engine Speed Sensor
S3: Ignition Switch
1: Dashboard
2: Engine Bay
3: Cabin
8: Driver Seat
9: Front Passenger Seat
11: Instrument Panel
11*a*: Opening (For Engine Sound Transmission)
12: Front Windshield
30: Engine
31: Transmission
50: Opening (For Engine Sound Transmission)
51: Film Member
52: Valve Member
60UL, 60UR, 60BL, 60BR: Speaker
70: DSP
71: Sound Source (For Audio)
72: Amplifier
73: Filter (For Inaudible Sound Removal)

What is claimed is:

1. A sound system for a vehicle including an engine and an audio device for an internal space of a cabin as sound sources disposed at given positions of the vehicle, the audio device being switchable between a first mode in which an audio sound including both an audible sound and an inaudible sound for a human is reproduced in the cabin and a second mode in which an audio sound including the audible sound but not including the inaudible sound is reproduced in the cabin, the sound system comprising:

a traveling state detector configured to detect a traveling state of the vehicle; and a switch controlling module executable by a processor to reproduce the audio sound in the first mode under a condition that a given traveling state is detected by the traveling state detector.

2. The sound system of claim 1, wherein the switch controlling module reproduces the audio sound in the second mode unless the given traveling state is detected by the traveling state detector.

3. The sound system of claim 1, further comprising:

an engine sound localizer configured to localize a sound generated by the engine to cause a vehicle driver inside the cabin to hear the sound from a first position;

an audio sound localizer configured to localize the audio sound generated by the audio device to cause the driver to hear the sound from a second position; and a localized position controlling module executable by the processor to control a distance between the first and second positions, wherein, when the audio sound is reproduced in the first mode, the localized position controlling module controls the distance between the first and second positions to be closer than when the audio sound is reproduced in the second mode.

4. The sound system of claim 3, wherein, when the audio sound is reproduced in the first mode, the localized position controlling module controls the first and second positions to overlap with each other.

5. The sound system of claim 3, wherein the first position is unchangeably set at a fixed position, and the localized position controlling module changes the second position.

6. The sound system of claim 3, wherein the first position and the second position are set forward of the vehicle driver seated on a driver seat, in the second mode, the second position is set lower than the first position, and in the first mode, the second position is moved upwardly to be closer to the first position.

7. The sound system of claim 1, wherein the given traveling state is a traveling state in which an operation load on the driver increases.

8. The sound system of claim 7, wherein the traveling state in which the operation load on the driver increases is a traveling state in which an engine speed exceeds a given speed.

9. The sound system of claim 7, wherein the traveling state where the operation load on the driver increases is a traveling state where a lateral acceleration acting on the vehicle exceeds a given value.

10. A sound system for a vehicle including an engine and an audio device for an internal space of a cabin as sound sources disposed at given positions of the vehicle, the audio device being switchable between a first mode in which an audio sound including both an audible sound and an inaudible sound for a human is reproduced in the cabin and a second mode in which an audio sound including the audible sound but not including the inaudible sound is reproduced in the cabin, the sound system comprising:

a traveling state detector configured to detect a traveling state of the vehicle;

a switch controlling module executable by a processor to reproduce the audio sound in the first mode under a condition that a given traveling state is detected by the traveling state detector;

an engine sound localizer configured to localize a sound generated by the engine to cause a vehicle driver inside the cabin to hear the sound from a first position;

an audio sound localizer configured to localize the audio sound generated by the audio device to cause the driver to hear the sound from a second position; and a localized position controlling module executable by the processor to control a distance between the first and second positions, wherein the switch controlling module reproduces the audio sound in the second mode unless the given traveling state is detected by the traveling state detector;

wherein, when the audio sound is reproduced in the first mode, the localized position controlling module controls the distance between the first and second positions to be closer than when the audio sound is reproduced in the second mode.

11. A sound system for a vehicle including an engine and an audio device for an internal space of a cabin as sound sources disposed at given positions of the vehicle, the audio device being switchable between a first mode in which an audio sound including both an audible sound and an inaudible sound for a human is reproduced in the cabin and a second mode in which an audio sound including the audible sound but not including the inaudible sound is reproduced in the cabin, the sound system comprising:

a traveling state detector configured to detect a traveling state of the vehicle, the traveling state detector including one or more of a G sensor, an engine speed sensor, and an ignition switch;

an opening formed in an instrument panel, the opening configured to localize a sound generated by the engine to cause a vehicle driver inside the cabin to hear the sound from a first position; and a plurality of speakers configured to localize the audio sound generated by the audio device to cause the driver to hear the sound from a second position; and a processor configured to:

reproduce the audio sound in the first mode under a condition that a given traveling state is detected by the traveling state detector, and reproduce the audio sound in the second mode unless the given traveling state is detected by the traveling state detector; and control a distance between the first and second positions to be closer when the audio sound is reproduced in the first mode than when the audio sound is reproduced in the second mode.

* * * * *